United States Patent [19]
Gupta

[11] Patent Number: 5,887,164
[45] Date of Patent: Mar. 23, 1999

[54] SYSTEM AND METHOD FOR ENABLING A TARGET COMPUTER TO USE STORAGE RESOURCES OF A HOST COMPUTER

[75] Inventor: Vivek Gupta, Beaverton, Oreg.

[73] Assignee: National Instruments Corporation, Austin, Tex.

[21] Appl. No.: 870,966

[22] Filed: Jun. 6, 1997

[51] Int. Cl.$^6$ .................................................. G06F 9/06
[52] U.S. Cl. ...................... 395/652; 395/200.52; 395/712
[58] Field of Search .................................. 395/712, 652, 395/651, 200.01, 653, 200.5, 200.52

[56] References Cited

U.S. PATENT DOCUMENTS

| | | | |
|---|---|---|---|
| 5,088,033 | 2/1992 | Binkley et al. | 395/500 |
| 5,280,627 | 1/1994 | Flaherty et al. | 395/700 |
| 5,327,549 | 7/1994 | Nissimov et al. | 395/425 |
| 5,581,785 | 12/1996 | Nakamura et al. | 395/828 |

OTHER PUBLICATIONS

Kuenster, Mark, Microsoft publication entitled, "Embedding Microsoft Windows 3.1," pp. 18–19.

Liming, Sean, Microsoft publication entitled, "Minimizing the Windows 95 Footprint For Embedded Systems Applications," pp. 14–17.

*Primary Examiner*—Ayaz R. Sheikh
*Assistant Examiner*—Omar A. Omar
*Attorney, Agent, or Firm*—Conley, Rose & Tayon; Jeffrey C. Hood

[57] ABSTRACT

A system and method for a target computer to use a storage device of its host computer and in particular for bootstrapping an operating system from the storage device onto the target computer. The computer system comprises a host computer coupled to a target computer via an I/O bus. In one embodiment the target computer is an embedded system comprising an intelligent data acquisition device. The host computer includes a disk drive with a file system and a file which serves as a virtual disk drive for the target computer, i.e., the file is essentially an image of a disk drive which would otherwise be coupled to the target computer. The target computer may be a BIOS level IBM-compatible personal computer. The target computer includes an option ROM with an int13H handler which hooks the disk service routine software interrupt vector of the target computer and forwards INT 13H requests to a device driver executing on the host computer via a shared memory on the target computer. The device driver converts the sector address specified in the INT 13H request input parameters into an offset into the virtual disk file and reads the data from the file to the shared memory. The int13H handler copies the data from the shared memory to its local memory, in the case of a read request, or from its local memory to the shared memory, in the case of a write request. The operating system booted onto the target computer may be different from the operating system executing on the host computer.

46 Claims, 7 Drawing Sheets

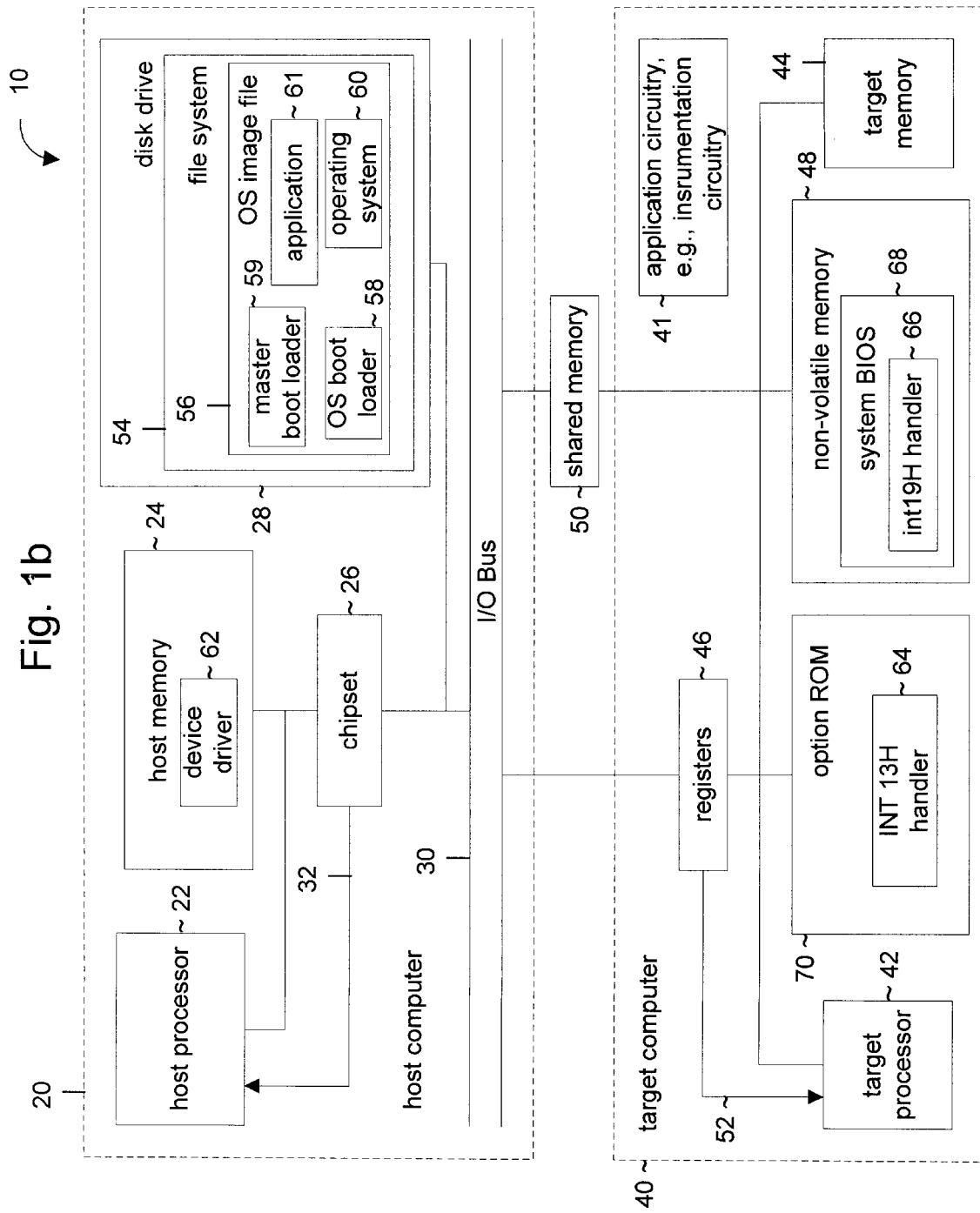

SYSTEM AND METHOD FOR ENABLING A TARGET COMPUTER TO USE STORAGE RESOURCES OF A HOST COMPUTER

FIELD OF THE INVENTION

The present invention relates to sharing resources between computer systems, and in particular to an embedded system using the storage resources of a host computer.

DESCRIPTION OF THE RELATED ART

An embedded system may be broadly defined as hardware and software which forms a component of a larger system and which executes a special purpose application program. Typically, an embedded system comprises a single-board microcomputer with software in read-only memory (ROM) and often includes an operating system. Often an embedded system must provide real-time response to events associated with the application being performed by the embedded system. Microcomputer-based embedded systems are becoming more and more common due, in part, to the rapidly declining cost of microprocessors and peripheral logic.

An example of an embedded system is an intelligent mass storage controller such as a disk array controller which plugs in as an expansion card to a host computer system. Another example of an embedded system is a software controlled instrument.

An instrument is a device which collects information from an environment and displays this information to a user. Examples of various types of instruments include oscilloscopes, digital multimeters, pressure sensors, etc. Types of information which might be collected by respective instruments include: voltage, resistance, distance, velocity, pressure, frequency of oscillation, humidity or temperature, among others. Some instruments plug into a host computer I/O bus, such as a Peripheral Component Interconnect (PCI) bus or Industry Standard Architecture (ISA) bus, while others plug into an external chassis, such as a VMEbus extensions for Instrumentation (VXI) instrument chassis.

As the cost of personal computers (PCs) relative to the computing power they provide has drastically decreased, PCs have become incorporated as an integral part of embedded systems. In addition, employing a PC as the basis of an embedded system may greatly diminish the development time associated with developing the basic hardware and software of the embedded system, thus enabling the embedded system designer to focus development time and resources on the application-specific portion of the design. The plethora of development tools, such as compilers and debuggers, which exist for PCs is another factor which makes incorporating a PC into an embedded system attractive. Furthermore, in many situations, a large amount of the application software of the embedded system may be developed on a standard PC prior to the availability of the embedded system hardware, thus potentially reducing development cycle time and development cost.

In addition to employing the hardware of a PC in an embedded system, some embedded systems have also incorporated PC operating systems, such as Microsoft® DOS® and WINDOWS®, as the operating system of the embedded system. Operating system vendors such as Microsoft have made efforts to provide versions of their operating systems tailored specifically for embedded systems. An article by Mark Kuenster and Jim Massoni entitled "Embedding Microsoft Windows 3.1" in the Microsoft Embedded Review advertising supplement, Sep. 16, 1996 discusses one such effort. In particular, efforts have been made to reduce the size of the operating system by eliminating portions of the operating system which may not be necessary in an embedded system application. Reducing the size of the embedded system operating system has been important since the operating system has typically resided in solid state memories, such as read-only memory (ROM), which is more expensive than the magnetic media memories, such as disk drives, on which the operating system of a standard PC resides.

Embedded systems today typically do not include magnetic storage media, such as disk drives, for a few reasons. First, attaching a disk drive to an embedded system may often introduce mechanical issues to the system, such as cabling, mounting, space and cooling issues. Second, adding a disk drive to the embedded system introduces an additional cost to the system, which may or may not be cost effective, particularly since most low cost disk drives today provide much more storage than is required by most embedded systems. Third, adding another disk drive to the overall system may decrease the reliability of the system, and in many applications the reliability of an embedded system is tantamount.

Some embedded systems have attempted to provide the relatively large amount of non-volatile storage required through solid state memory drives based on FLASH memory technology. An article by Sean Liming entitled "Minimizing The Windows 95 Footprint For Embedded Systems Applications" in the Microsoft Embedded Review advertising supplement, Sep. 16, 1996 discusses using FLASH-based drives for embedded system operating system storage. FLASH-based drives advantageously are faster, smaller and environmentally more robust than their rotating media hard drive counterparts. However, as with ROM-based and hard drive-based solutions, adding a FLASH drive increases the cost of the embedded system, sometimes significantly.

Thus, an improved system and method for providing relatively large amounts of non-volatile storage for embedded system devices is desired, and in particular for providing non-volatile storage for an operating system and application software of an embedded system and for bootstrapping the operating system from the non-volatile storage.

SUMMARY OF THE INVENTION

The present invention provides a system and method for a target computer to use a storage device of its host computer, and in particular for bootstrapping an operating system from the storage device of the host computer into the target computer. The computer system comprises a host computer coupled to a target computer via an I/O bus, such as a PCI bus, VMEbus or Multisystem extension Interface (MXI) bus. In one embodiment the target computer is an embedded system comprising an instrumentation system, such as an intelligent data acquisition device.

The host computer includes a processor, system memory, an expansion bus, and a disk drive with a file system. The target computer is preferably coupled to the expansion bus of the host computer. Preferably, the target computer is a personal computer which is IBM-compatible at least at the Basic Input/Output System (BIOS) level. The target computer includes a processor, memory, and system BIOS. In the preferred x86 architecture embodiment, the target computer includes an option ROM with an int13H handler which hooks the BIOS disk service routine software interrupt vector of the target computer. The target computer does not have an attached disk drive, but rather uses a file in the file system on the disk drive or non-volatile storage device of the host computer. Thus the host disk drive acts as a virtual or apparent disk drive for the target computer. The file is essentially an image of a disk drive which might have been attached to the target computer, but which is unnecessary due to the virtual disk drive comprising the file in the file system on the host computer disk drive.

In the preferred embodiment, a shared memory is coupled between the target computer and host computer and is used to transfer data between the target computer local memory and the virtual disk drive. When the int13H handler in the target computer receives an INT 13H disk service request from the target computer, the int13H handler forwards the input parameters of the disk request, via the shared memory, to a device driver which executes on the host computer processor. Preferably the int13H handler generates an interrupt to the host computer processor to notify the host processor of the forwarded disk request parameters. The device driver executing in the host computer receives the disk request from the int13H handler and performs the transfer of data, either from the virtual disk drive to the shared memory in the case of a read request or from the shared memory to the virtual disk drive in the case of a write request, wherein the virtual disk drive comprises the file in the file system of the host computer disk drive. The device driver notifies the int13H handler of the disk request completion, i.e., the transfer of data between the virtual disk and the shared memory, preferably by generating an interrupt to the target computer processor. Prior to performing the disk request, the device driver executing in the host computer converts the INT 13H sector/head/cylinder format disk sector address specified in the INT 13H request input parameters into a byte offset into the file on the host computer disk drive.

In the case of a read request, the int13H handler copies the data from the shared memory to its local memory in response to the interrupt generated by the device driver. The int13H handler then completes the request to the original issuer of the INT 13H request, such as a system BIOS warm boot service routine, a master boot loader, an operating system boot loader, the operating system itself, in particular the file system software of the operating system, or an application program which issues INT 13H requests directly. In the case of a write request, the int13H handler copies the data from its local memory to the shared memory prior to forwarding the INT 13H request to the device driver.

In one embodiment, the host computer is a multi-processor system. In one embodiment, a plurality of target computers may be coupled to the host computer. The host computer and device driver are operable to service requests from each of the plurality of computers. In one embodiment, the host computer and target computer communicate through a network, such as an Ethernet or Token Ring local area network.

Advantageously, the system and method provides relatively large amounts of non-volatile storage for an embedded system device coupled to a host computer. The system and method potentially reduce the overall system cost over previous solutions by using the storage already available on the host computer. The system and method avoid the introduction of mechanical and thermal complexity of connecting a dedicated disk drive to the embedded system. The system and method is independent of the host computer and operating system executing on the host computer. That is, the operating system booted onto the target computer may be different from the operating system executing on the host computer. The system and method is capable of booting onto the embedded system any of various types of operating systems.

BRIEF DESCRIPTION OF THE DRAWINGS

A better understanding of the present invention can be obtained when the following detailed description of the preferred embodiment is considered in conjunction with the following drawings, in which:

FIG. 1a and 1b are block diagrams of a computer system according to alternate embodiments of the present invention;

Figure 1:
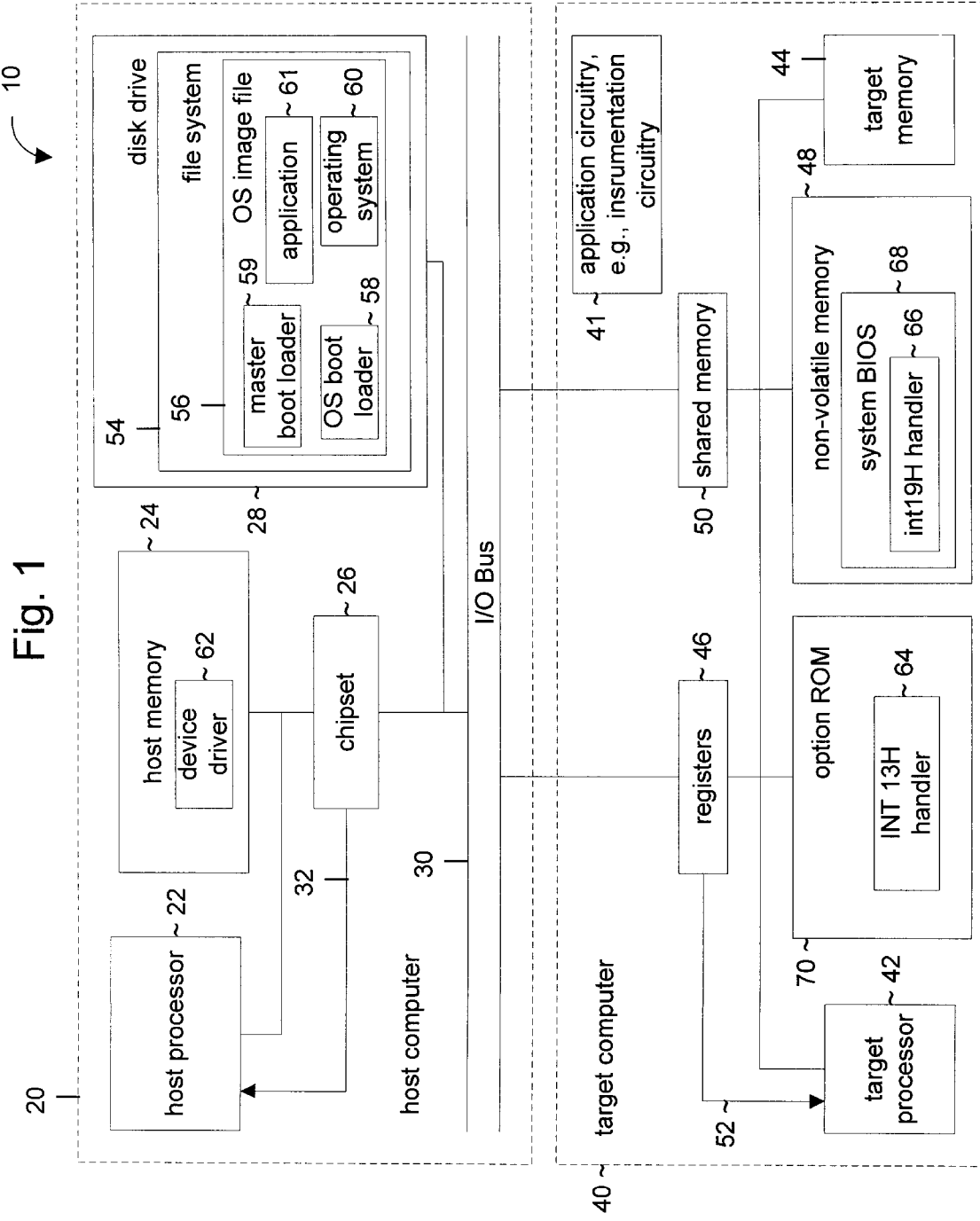
FIG. 1 is a block diagram of a computer system according to a preferred embodiment of the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

FIG. 1 - Computer System

Referring now to FIG. 1, a block diagram illustrating a computer system 10 according to a preferred embodiment of the present invention is shown. Preferably, the system 10 comprises a host computer 20 including an I/O bus, and a target computer 40 coupled to the host computer 20 by the I/O bus 30. The target computer 40 can also be considered as being comprised within the host computer 20.

The host computer 20 comprises a host processor 22, a host memory 24 coupled to the host processor 22. Preferably, chipset logic 26 couples the host processor 22 and host memory 24 to the I/O bus 30. In one embodiment, the host computer is a multi-processor computer system comprising a plurality of host processors coupled to the I/O bus 30 via the chipset logic 26. The host computer 20 further comprises a non-volatile storage device 28, preferably coupled to the I/O bus 30. The non-volatile storage device 28 can be any of various non-volatile memory types, such as a disk drive, a floppy disk drive, an optical disk drive, or a tape drive, among others. The non-volatile storage device 28 is referred to throughout as disk drive 28.

A device driver 62 is loaded into the host memory 24, preferably from the disk drive 28, and executed by the host processor 22. The device driver 62 communicates with the target computer 40 for the purpose of transferring data between the disk drive 28 and the target computer 40, as will be discussed in more detail below with regard to the flowchart of FIG. 3. The disk drive 28 includes a file system 54. The file system 54 includes any method for organizing and storing files in a computer system. Examples of the file system 54 are the DOS FAT file system, Microsoft Windows NT File System (NTFS), the UNIX System V filesystem, the Berkeley Standard Distribution (BSD) UNIX file system (ufs), and the OS/2 High Performance File System (hpfs).

The file system 54 of the disk drive 28 includes an OS image file 56 which is useable by the target computer 40 for storing data which may be transferred between the target computer 40 and disk drive 28. The OS image file 56 serves essentially as a virtual disk drive for the target computer 40, as will be described below. The OS image file 56 includes an operating system 60 for loading, or "booting" onto the target computer 40, an OS boot loader 58 which executes on the target computer 40 and loads the operating system 60 from the OS image file 56 onto the target computer 40, and a master boot loader 59 which loads the OS boot loader 58 from the OS image file 56 onto the target computer 40. The OS image file 56 may further include application specific software programs or other software which execute on the target computer 40.

The host computer 20 may be any general purpose computer which provides an interface means, such as the I/O bus 30, for coupling the target computer 40 to the host computer 20, which provides a disk drive 28 for storing the OS image file 56, and which is capable of executing the device driver 62 for controlling the transfer of data between the OS image file 56 and the target computer 40. Examples of the host computer 20 are APPLE® MacIntosh® computers, SUN Microsystems® workstations, other engineering workstation computers such as those employing a MIPS® reduced instruction set computer (RISC) processor, DEC Alpha® RISC processor, PowerPC® RISC processor, and personal computers, such x86 architecture computers. Preferably, the host computer 20 includes an interrupt request signal 32 by which the target computer 40 may generate an interrupt to the host processor 22.

As mentioned above, the target computer 40 is coupled to the I/O bus 30. In the preferred embodiment, the target computer 40 is comprised on an expansion card which is adapted for insertion into a slot of the I/O bus 30. Thus, in the preferred embodiment, the target computer 40 is an add-in card to the host computer 20.

Preferably, the target computer 40 is an expansion card which plugs into the I/O bus 30, wherein the I/O bus 30 is a Peripheral Component Interconnect (PCI) bus, an Industry Standard Architecture (ISA) bus, an Extended Industry Standard Architecture (EISA) bus, a NuBus, or a Micro-Channel bus. In one embodiment, the target computer 40 is an embedded system which plugs into the I/O bus 30, wherein the I/O bus 30 is a VMEbus or a VMEbus extension for Instrumentation (VXI) bus. In one embodiment, the target computer 40 resides in a separate chassis, such as a VXI instrument chassis, and the instrument chassis is coupled to the host computer 20 via a Multisystem eXtension Interface (MXI) bus. In one embodiment, the target computer 40 is a General Purpose Interface Bus (GPIB) instrument which is coupled to the host computer 20 via the I/O bus 30, which is a GPIB bus.

The target computer 40 includes application specific circuitry 41 which is controlled by the target processor 42. In one embodiment, the application specific circuitry is comprised upon a circuit board which couples to the target computer 40 via an expansion slot of the target computer 40. Preferably, the application circuitry 41 comprises instrumentation circuitry, such as an intelligent data acquisition device. In one embodiment, the embedded system application is an instrument, such as an oscilloscope, digital multimeter, pressure sensor, etc. The data acquisition device or instrument is controlled by software, such as a virtual instrument graphical dataflow program created by and executing within the National Instruments® LabVIEW® programming environment, which executes on the host computer 20. U.S. Pat. No. 4,901,221 to Kodosky et al, which is hereby incorporated by reference in its entirety as though fully described herein, discloses a graphical programming environment which enables a user to create graphical dataflow programs for controlling instruments and data acquisition devices.

The target computer 40 comprises a target processor 42. Preferably, the target processor 42 is an x86 architecture processor, such as an i386, i486 or Pentium® processor. A target memory 44, preferably comprising random-access memory (RAM), is coupled to the target processor 42 for storing data transferred to and from the OS image file 56, such as the operating system 60, the OS boot loader 58, the master boot loader 59, application programs and program variables of a Basic Input/Output System (BIOS) 68 stored in a non-volatile memory 48 and an INT 13H handler 64 stored in an option ROM 70. The int13H handler 64 and option ROM 70 will be described in more detail below with reference to FIG. 2.

Preferably, the target computer 40 includes registers 46 coupled to the I/O bus 30 which may be written by the device driver 62 in order to generate an interrupt request signal 52 to the target processor 42 to indicate the completion of a transfer of data between the OS image file 56 and the target computer 40, as will be described below.

Preferably, the target computer 40 is essentially an IBM-compatible personal computer without a hard disk drive. In one embodiment, "IBM-compatible" is defined as being compatible at the BIOS level with an IBM PC/AT personal computer. The BIOS is the part of the operating system of an IBM-compatible PC that provides the lowest level interface to peripheral devices, such as a disk drive or video display device. The embodiment described herein presumes that the target computer 40 is a PC, and thus the disclosed embodiment uses an INT 13H handler for disk services. However, it is noted that the present invention may be adapted to other types of computers.

The x86 architecture includes a plurality of software interrupts which may be generated by executing an "INT xx" instruction, wherein "xx" is a hexadecimal value which serves as an index into an interrupt vector table. Each entry in the interrupt vector table includes an address of a software routine, i.e., an interrupt service routine. When an INT xx instruction is executed, the processor fetches the interrupt service routine address from the interrupt vector table indexed by the value xx and jumps, i.e., transfers execution, to the fetched address. In an IBM-compatible computer, certain of the software interrupts correspond by convention to various BIOS service routines. For most of the BIOS service routines, parameters are passed as input to the service routine via the registers of the target processor 42, such as the AX, BX, CX, and DX x86 architecture registers. Conversely, the target processor 42 registers are typically used by the BIOS service routine to return output parameters, such as status, to the BIOS service routine caller upon completion. For example, a sector address associated with a disk request may be passed as an input parameter to a BIOS disk service routine via the target processor 42 registers.

The target computer 40 system BIOS 68 is stored in the non-volatile memory 48, such as a read-only memory (ROM) or FLASH ROM, and includes a software interrupt 19H handler 66, commonly referred to as an int19H handler.

According to the IBM PC BIOS specification INT 19H is the warm boot handler interrupt. The target computer 40 int19H handler 66 is similar in function to a typical IBM-compatible int19H handler. More details concerning the operation of the int19H handler 66 are given with reference to the flowchart of FIG. 2.

The int13H handler 64 is stored in the option ROM 70, such as a read-only memory (ROM) or FLASH ROM, and includes a software interrupt 13H handler 64, commonly referred to as an int13H handler. According to the IBM BIOS specification INT 13H is the disk services handler interrupt. The target computer 40 int13H handler 64 is advantageously adapted to receive INT 13H requests and to forward the INT 13H request parameters to the device driver 62 which uses the parameters of the INT 13H request to perform disk requests on the OS image file 56 as will be described below. The option ROM 70 further comprises an initialization routine for the int13 handler 64 which will be described in more detail below with reference to the flowchart of FIG. 2.

Figure 1A:
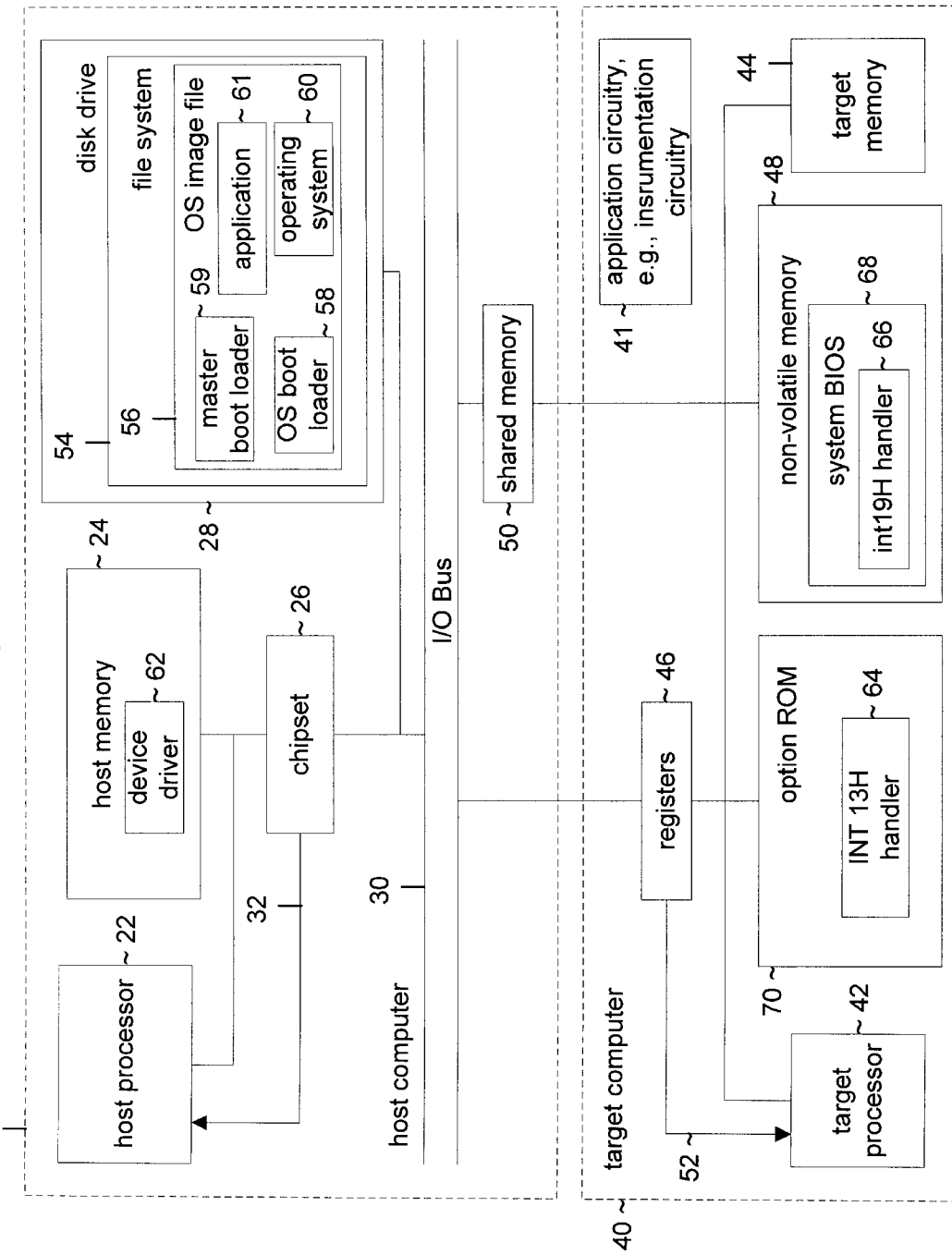

The computer system 10 further comprises a shared memory 50 coupled between the target computer 40 and the host computer 20. The shared memory 50 is addressable by both the host processor 22 and the target processor 42. The shared memory 50 is used to transfer data between the OS image file 56 and the target computer 44. Preferably, the shared memory 50 is also used by the int13H handler 64 to transfer int13H request parameters to the device driver 62 and by the device driver 62 to return int13H parameters to the int13H handler 64. In the preferred embodiment, the shared memory 50 is comprised within the target computer 40, as shown in FIG. 1. In an alternate embodiment, the shared memory 50 is comprised within the host computer 20, as shown in FIG. 1a. In another alternate embodiment, the shared memory 50 is comprised within a third location remote and yet common to each of the host 20 and target computers 40, as shown in FIG. 1b. In yet another alternate embodiment, the host computer 20 and target computer 40 exchange data across a network, such as an Ethernet or Token Ring local area network.

Figure 2:
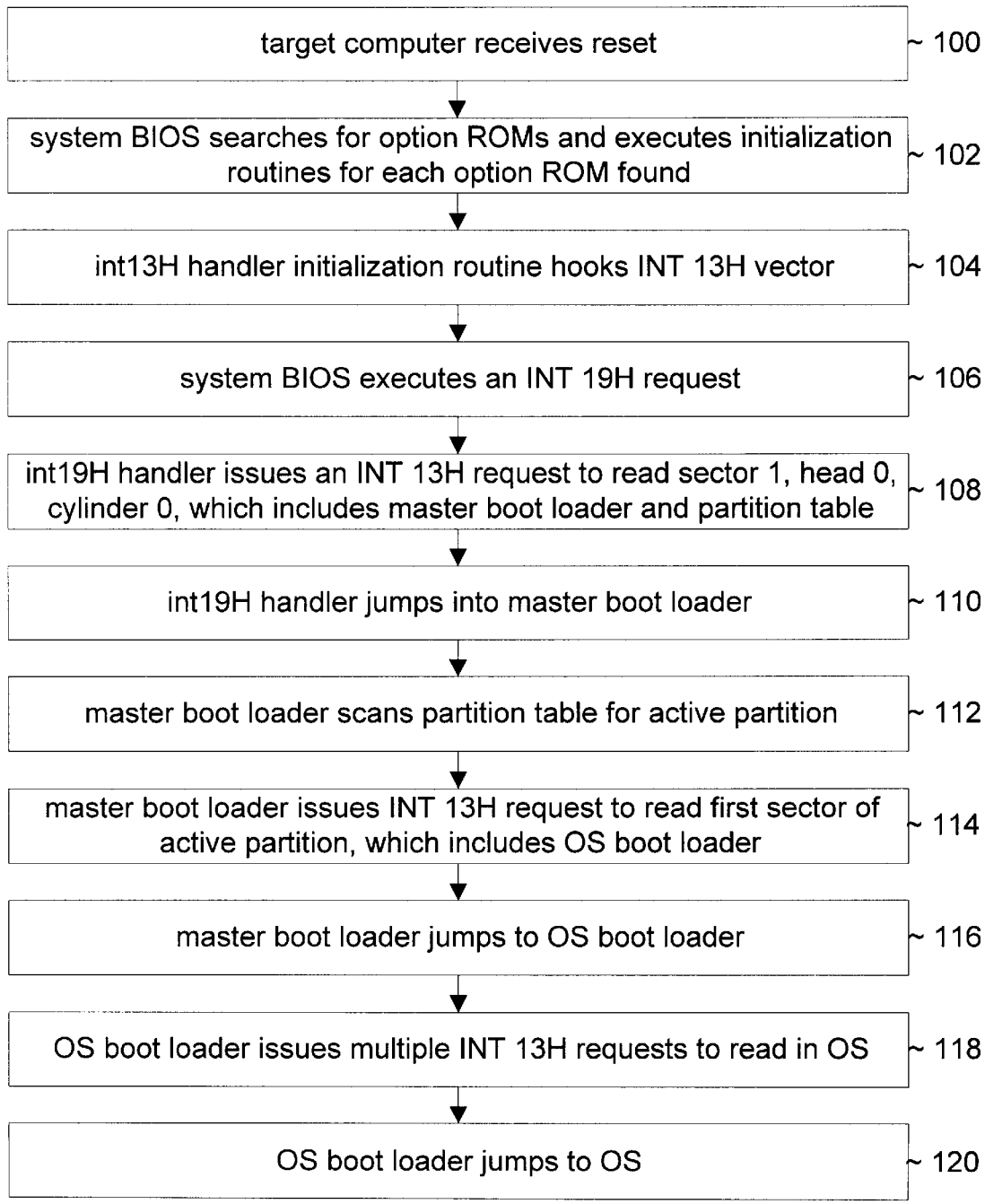
FIG. 2 is a flowchart illustrating steps taken by the target computer of FIG. 1 to bootstrap the operating system of FIG. 1 from the OS image file of FIG. 1.

FIG. 2 - Boot sequence

Referring now to FIG. 2, a flowchart illustrating steps taken by the target computer 40 to bootstrap the operating system 60 from the OS image file 56 is shown. The flowchart of FIG. 2 is specific to an embodiment in which the target computer 40 is a PC.

The target processor 42 receives a reset from the target computer 40, in step 100. Preferably, the reset is a power-on reset or a reset generated by logic on the target computer 40 as the result of the target computer 40 itself being reset, typically via a signal on the I/O bus 30. When the target processor 42 receives the reset it executes the power on self test (POST) routines which perform tasks such as diagnostic tests to verify the correct operation of various system components such as the target processor 42 itself, the target memory 44 and the shared memory 50.

The POST routines then search for the presence of option ROMs in the target computer 40 and execute the initialization routine of each option ROM found, in step 102. An "option ROM" is a memory, typically a non-volatile memory, of a device which is optionally configured in a personal computer. For example, an optional disk controller may be plugged into an I/O slot of the computer and the disk controller may include an option ROM which resides in the memory space of the computer processor. Option ROMs reside in a predetermined portion of the processor memory space. Typically, personal computer option ROMs reside in the range C000:0000 through E000:FFFF.

An option ROM includes a software program which typically includes BIOS routines which are in addition to the system BIOS routines provided on the computer. Each option ROM optionally includes an initialization routine which is executed by the POST routines prior to booting the operating system.

When the POST routine executes the option ROM 70 initialization routine, the option ROM 70 initialization routine "hooks" the INT 13H vector of the target processor 42, in step 104. Hooking the INT 13H vector comprises replacing the current value of the INT 13H interrupt vector in the interrupt vector table of the target processor 42 with the address of the int13H handler 64. Thus, the int13H handler 64 henceforth receives software interrupt 13H disk service requests and services them.

After the POST routine has performed its necessary operations, it executes an INT 19H request to perform a warm boot, in step 106. The int19H handler 66 issues an INT 13H request to read sector 1 on head 0 of cylinder 0, in step 108. By convention sector 1, head 0, cylinder 0 is the first user-visible sector on a disk drive. By convention on personal computers, the first user-visible sector includes a partition table and a master boot loader program.

The input parameters of an INT 13H request are defined as follows. All register references are to x86 architecture registers. The AH register includes the operation type. In particular, a value of 2 denotes a read operation and a value of 3 denotes a write operation. The AL register includes the number of sectors to read. The CH register includes the lower order eight bits of the cylinder number. The cylinder number is a zero-based cylinder number. Bits 0 through 5 of the CL register include the sector number. Allowable values of the sector number are 1 through 63, i.e., the sector number is a one-based number. Bits 6 and 7 of the CL register include the higher order two bits of the cylinder number. The DH register includes the head number. The head number is a zero-based number. The DL register includes the drive number if multiple drives are present. By convention bit 7 is set to access a hard disk. The memory address of the data buffer associated with the data transfer is specified in the ES:BX registers.

The output, i.e., return parameters of an INT 13H request are defined as follows. The CF register is set if an error condition occurs and cleared if the operation was successful. The AH register includes the status value of the operation. The AL register includes the number of sectors transferred.

Because the int13H handler 64 initialization routine hooked the INT 13H vector previously, the int13H handler 64 receives the INT 13H request from the INT 19H handler and forwards the INT 13H request input parameters to the device driver 62. The device driver 62 fulfills the request to read the first sector by reading the first sector worth of data from the OS image file, which includes the master boot loader 59 and the partition table, into the shared memory 50. The int13H handler 64 then copies the data from the shared memory 50 to the target memory 44. The operation of the int13H handler 64 and the device driver 62 will be described in more detail with reference to the flowchart of FIG. 3.

By convention, disk drives of personal computers are typically divided into between one and four partitions. Each partition occupies a contiguous number of sectors on the hard drive. Each partition may contain a different operating system. A predetermined number of bytes of the first sector of a disk are devoted to the partition table which specifies the number of partitions, the first sector of each partition, the size of each partition, the operating system type of each partition, and which partition is active, i.e., bootable.

After reading the first sector into the target memory 44, the INT 19H handler jumps to the master boot loader 59 program and gives control to the master boot loader 59 program, in step 110. The master boot loader 59 scans the partition table for an active partition, in step 112. The master boot loader 59 then issues an INT 13H request, which is serviced by the int13H handler 64 as described in FIG. 3, to read the first sector of the active partition into the target memory 44, in step 114. The first sector of the active partition includes the OS boot loader 58. The OS boot loader 58 is a software program which has knowledge of the location and size of the operating system 60 and how to bootstrap the operating system 60.

After reading the OS boot loader 58 into the target memory 44, the master boot loader 59 jumps to the OS boot loader 58, in step 116. The OS boot loader 58 issues a plurality of INT 13H requests, which are serviced by the int13H handler 64 as described in FIG. 3, to read the operating system 60 into the target memory 44, in step 118. After reading the operating system 60 into the target memory 44, the OS boot loader 58 jumps to the operating system 60, in step 120, at which point the operating system 60 is bootstrapped.

For some operating systems, the operating system 60 is a file itself in a file system. In other words, the operating system 60 includes file system software which creates a file system within the OS image file 56 and the operating system 60 is simply a file within that file system. For these operating systems, the OS boot loader 58 has the file system software, or at least a portion thereof, included in it. That is, the OS boot loader 58 is capable of reading files, in particular the operating system 60 file, from the file system created within the virtual disk of the OS image file 56. In this case, the OS boot loader 58 issues file system level read requests, in step 118, rather than INT 13H requests, to read in the operating system 60. In this case, the file system software in the OS boot loader 58 converts the file system level read requests into INT 13H disk requests and issues the INT 13H requests to the int13H handler 64.

It is noted that multiple target computers such as target computer 40 may be coupled to the host computer 20 and bootstrap their operating systems from the host computer 20. The steps described in FIG. 2 may be performed by each of the target computers coupled to the host computer 20. The device driver 62 is operable to service multiple target computers. That is, the device driver is operable to receive requests from multiple target computers and to service the requests from the host computer's disk drive 28. In one embodiment, each of the target computers shares the OS image file 62. In another embodiment, multiple OS image files, i.e., one OS image file such as OS image file 56 for each of the multiple target computers, are comprised within the disk drive 28. This embodiment is particularly advantageous wherein the target computers write to what would be common areas of the OS image file. The device driver is operable to associate respective OS image files with the respective target computers.

In one embodiment, the multiple target computers share a common interrupt request signal to the host processor 22. The device driver 62 determines which of the target computers has interrupt the host processor 22 and services the appropriate target computer's request. In one embodiment, the device driver 62 determines which of the target computers have generated requests via registers on the target computers. In another embodiment, the device driver 62 determines which of the target computers have generated requests via the contents of the shared memory 50. In another embodiment, the multiple target computers each comprise a distinct interrupt request signal to the host processor 22, thereby enabling the device driver 62 to determine which of the target computers have generated requests to the host processor 22.

FIG. 3 - Int13H request handling method

Figure 3A:
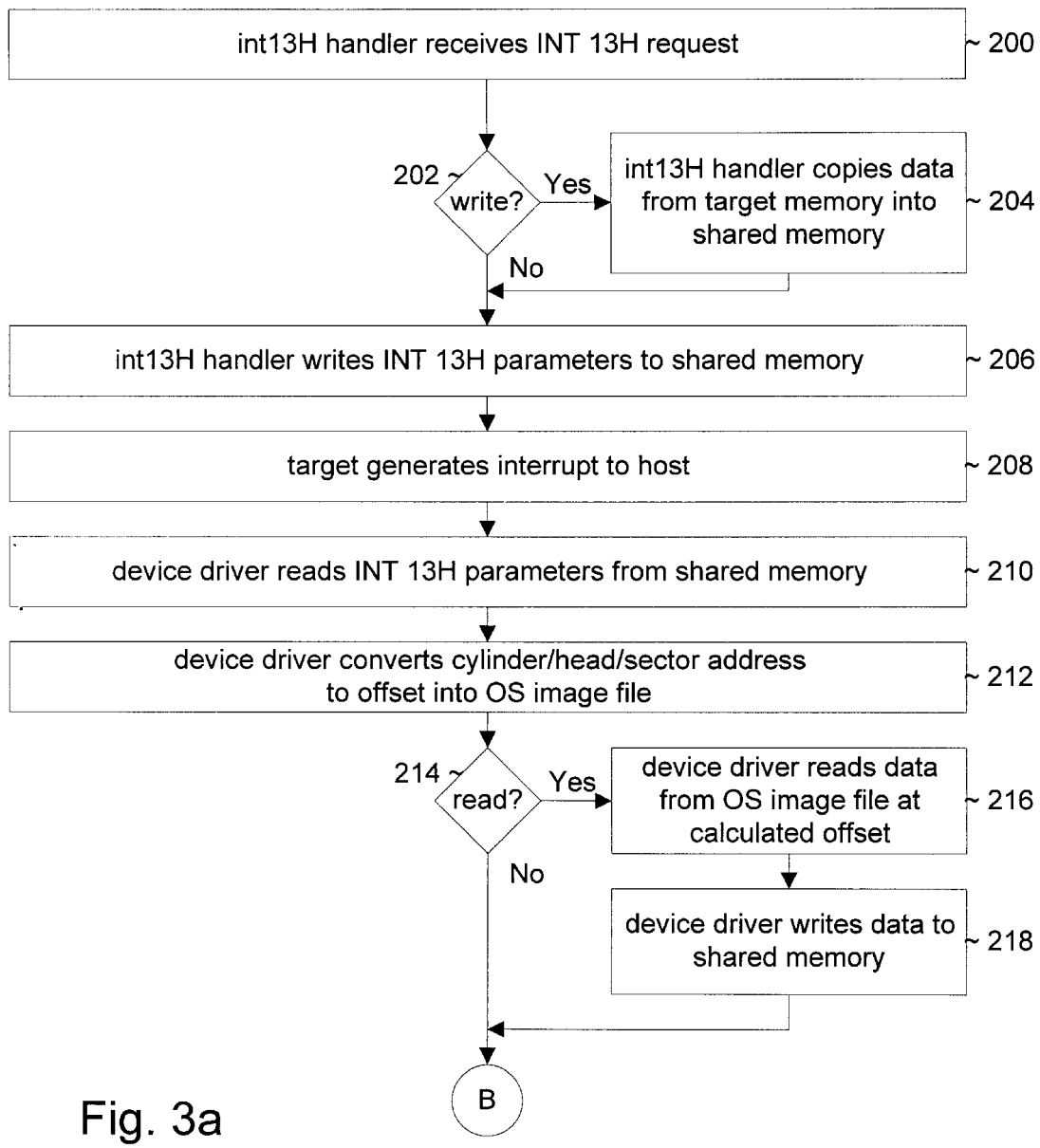
FIG. 3a and 3b are flowcharts illustrating steps performed by the int13H handler and device driver of FIG. 1 in servicing INT 13H requests from the target computer of FIG. 1.
Figure 3B:
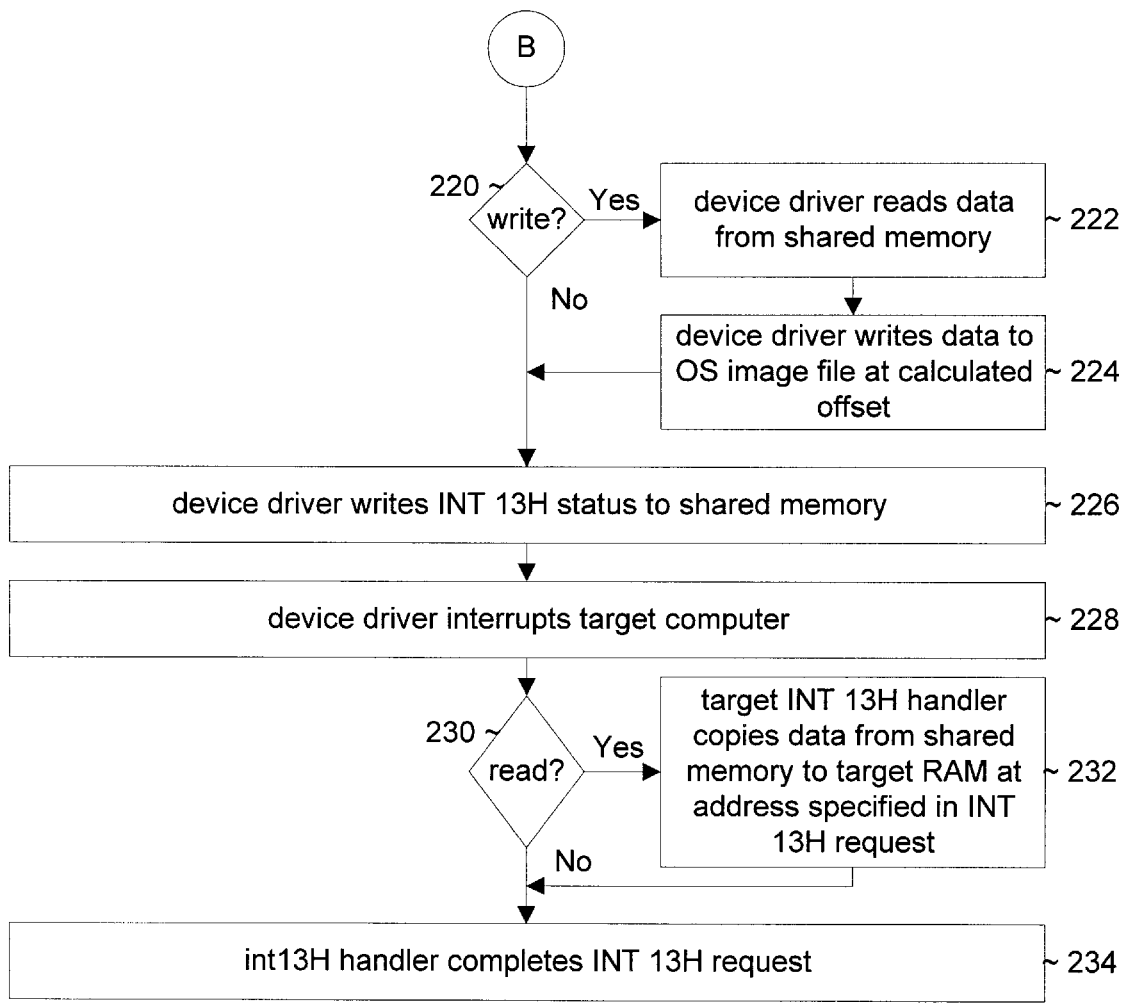

Referring now to FIG. 3 (collectively referring to FIGS. 3a and 3b), a flowchart illustrating steps performed by the int13H handler 64 and device driver 62 to fulfill an INT 13H request is shown. The int13H handler 64 receives an INT 13H request, in step 200. In the flowchart of FIG. 2, the INT 13H requests are generated by the int19H handler 66, the master boot loader 59 or the OS boot loader 58. However, the int13H handler 64 is configured to service INT 13H requests issued by any software program executing on the target processor 42, such as the file system software portion of the operating system 60 or an application program which issues INT 13H requests directly.

To the issuer of an INT 13H request the int13H handler 64, working in conjunction with the device driver 62, essentially gives the appearance that a disk drive is actually connected to the target computer 40. However, in reality the data of the apparent disk drive is included in the OS image file 56 stored on the host computer 20, as will be discussed below.

The int13H handler 64 determines whether or not the INT 13H request is a write request, i.e., a request to write data to the disk, in step 202. If the INT 13H request is a write request, the int13H handler 64 copies the data from the target memory 44 to the shared memory 50, in step 204. The int13H handler 64 writes the input parameters of the INT 13H request to the shared memory 50, in step 206. The int13H handler 64 then generates an interrupt to the host processor 22, in step 208. Preferably, the int13H handler 64 generates an interrupt to the host processor 22 via the interrupt request signal 32.

In response to the interrupt generated by the int13H handler 64, the device driver 62 reads the INT 13H request input parameters from the shared memory 50, in step 210. The device driver then converts the sector address specified by the INT 13H request sector, head, and cylinder input parameters into an offset into the OS image file 56, in step 212. Converting the sector address into the byte offset of the OS image file 56 is a function of the geometry, i.e., the number of heads, cylinders and sectors per track of the virtual disk. Preferably, converting the sector address into the byte offset of the OS image file 56 is performed according to equations (1) and (2) below.

$$\text{sector\_offset} = \text{sector} + (\text{head} \times \text{sectors\_per\_track}) + (\text{cylinder} \times \text{sectors\_per\_cylinder}) \quad (1)$$

$$\text{byte\_offset\_in\_file} = \text{sector\_offset} \times \text{bytes\_per\_sector} \quad (2)$$

Preferably, the number of bytes_per_sector is 512. The sectors_per_cylinder is the product of the number of sectors_per_track and the number of heads. Preferably, the sectors_per_track and heads for the apparent disk drive representing the OS image file 56 is a predetermined value. In one embodiment, the number of sectors_per_track is 64 and the number of heads is 32.

After converting the sector address, the device driver 62 determines if the INT 13H request is a request to read data, in step 214. If the request is a read request, the device driver 62 reads the data from the OS image file 56 at the calculated offset, in step 216, and writes the data to the shared memory 50, in step 218. The device driver 62 determines if the INT 13H request is a request to write data, in step 220. If the request is a write request, the device driver 62 reads the data from the shared memory 50, in step 222 and writes the data to the OS image file 56 at the calculated offset, in step 224.

Preferably, the device driver 62 reads or writes data from or to the OS image file 56 using programming interface calls provided by the file system software portion of the operating system executing on the host processor 22 which provide file system level access to device drivers. In one embodiment, the device driver 62 exchanges messages with an application program executing on the host processor 22. The device driver 62 sends a message to the application program indicating a request to read or write data to or from the OS image file 56. The application program performs the requested read or write from or to the OS image file 56 and sends a message to the device driver 62 indicating the completion of the request.

After the device driver 62 has transferred the data, either from the shared memory 50 to the OS image file 56 for a write request or from the OS image file 56 to the shared memory 50 for a read request, the device driver 62 writes the disk request output parameters to the shared memory 50, in step 226 and generates an interrupt to the target processor 42, in step 228. Preferably, the device driver 62 interrupts the target processor 42 by writing to the registers 46 to generate the target IRQ signal 52. Preferably, the disk request output parameters include an output parameter indicating the completion status of the request.

In response to the interrupt generated by the device driver 62, the int13H handler 64 determines if the INT 13H request was a read request, in step 230. If the request was a read request, the int13H handler 64 copies the data from the shared memory 50 to the target memory 44, in step 232. Preferably, the int13H handler 64 copies the data to the target memory 44 at the address specified by the INT 13H request parameters, in particular the address specified in the ES:BX registers. Once the int13H handler 64 has performed the requested disk operation, the int13H handler 64 completes the INT 13H request by setting the appropriate output parameter values in the registers of the target processor 42 and returns control to the program which generated the INT 13H request, in step 234. Preferably, returning control to the requesting program includes performing an IRET instruction.

The location to which the input parameters, the output parameters and the data are transferred into and out of the shared memory 50 is known by both the int13H handler 64 and the device driver 62. Preferably, the locations of the data, input parameters and output parameters are predetermined. In one embodiment, the device driver 62 determines the locations from the int13H handler 64 at initialization time.

As mentioned with reference to FIG. 2, multiple target computers such as target computer 40 may be coupled to the host computer 20 and bootstrap their operating systems from the host computer 20 using the method of FIG. 3. The steps described in FIG. 3 may be performed by each of the target computers coupled to the host computer 20.

Figure 4:
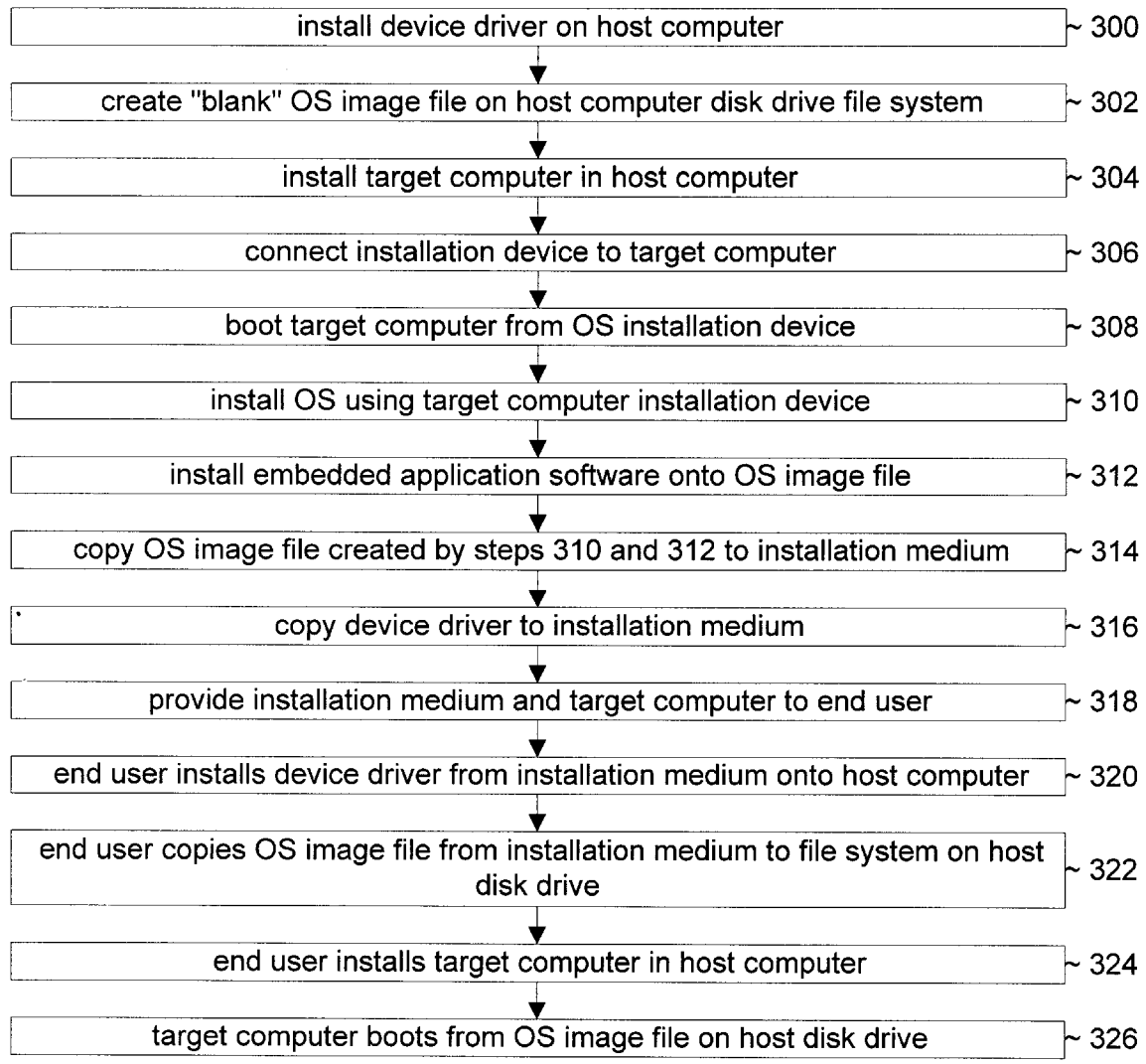
FIG. 4 is a flowchart illustrating steps taken to install the operating system of FIG. 1 onto the OS image file of the host disk drive of FIG. 1.

FIG. 4 - Installation method

Referring now to FIG. 4, a flowchart illustrating steps taken to install the operating system 60 onto the OS image file 56 is shown. Preferably, the flowchart describes the process by which a manufacturer of the target computer 40 may create and distribute an installation medium including the OS image file 56 and device driver 62 to an end user. The flowchart also describes the process by which an end user may receive the installation medium and the target computer 40 and install the device driver 62, OS image file 56 and target computer 40 on the host computer 20 and boot the target computer 40 from the OS image file 56. However, it is noted that steps 300 through 312 could be performed by the user rather than the manufacturer to install the operating system and associated software onto the "virtual disk drive" comprising the OS image file 56, thus obviating steps 314 through 326, if appropriate.

The manufacturer installs the device driver 62 on the host computer 20, in step 300. Installing the device driver 62 is a step specific to the particular operating system executing on the host computer 20. The installation of device drivers for various operating systems is well known in the art of device driver development.

The manufacturer then creates a "blank" OS image file 56 in the file system 54 on the disk drive 28, in step 302. Preferably, a blank OS image file 56 is a zero length, i.e., empty file, the creation of which is well known in the art. In one embodiment, the device driver 62 is capable of creating a blank file and thus step 302 is not necessary, but rather the device driver creates the OS image file 56 during the first time the OS image file 56 is written to by the device driver 62, which would occur in step 310.

The manufacturer then installs the target computer 40 in the host computer 20, in step 304. Preferably, installing the target computer 40 in the host computer 20 comprises plugging the target computer 40 into an expansion slot of the host computer 20 such as an ISA or PCI slot.

The manufacturer then connects a software installation device, such as a floppy disk drive, to the target computer 40, in step 306, inserts a boot installation medium, such as a floppy disk, of the operating system 60 into the target computer 40 software installation device and boots the target computer 40 from the software installation device, in step 308. The boot installation medium includes one or more software installation programs for creating a partition table on the OS image file 56 virtual disk, installing the master boot loader 59, OS boot loader 58 and operating system 60 onto the OS image file 56 virtual disk, and, creating a file system on the OS image file 56 virtual disk. The boot installation medium is a standard boot installation medium for the operating system 60 to be installed, such as the boot installation medium for Microsoft Windows 95 or Microsoft Windows 3.1.

The manufacturer then installs the operating system 60 from a software installation medium, such as floppy disks, as in a typical installation of the operating system 60 on a PC, in step 310. The software installation medium and boot installation medium may be the same installation medium depending upon the operating system 60 being installed. The software installation medium is a standard boot installation medium for the operating system 60 to be installed, such as the software installation medium for Microsoft Windows 95 or Microsoft Windows 3.1. In one embodiment, the operating system 60 may be installed from CDROM or other medium by connecting a CDROM drive or other appropriate drive to the target computer 40. As the operating system 60 is installed in a typical manner, the master boot loader 59, OS boot loader 58, and operating system 60 are written to the OS image file 56, which appears to the target computer 40 as a virtual disk drive, due to the steps performed by the int13H handler 64 and device driver 62 as described above in FIG. 3.

It is noted that the int13H handler 64 only services INT 13H hard disk requests, i.e., it does not service INT 13H requests for devices other than a hard drive. Thus, it does not service requests which are designated for the floppy disk drive connected to the target computer 40. Instead, the int13H handler 64 chains INT 13H requests for a floppy disk drive on to the floppy disk service routine of the system BIOS 68. The operating system installation software executing on the target computer 40 issues INT 13H requests to install the master boot loader 59, OS boot loader 58, and operating system 60. The int13H handler 64 executing on the target computer 40 services the INT 13H requests and writes the requested data, i.e., master boot loader 59, OS boot loader 58 and the operating system 60, to the OS image file 56 as described in the flowchart of FIG. 3.

It is noted, as was discussed with reference to step 118 of FIG. 2, that the operating system 60 may itself be a file within a file system. In such case, the OS boot loader 58 issues file system level write requests to write the operating system 60 rather than INT 13H requests to write the operating system 60. In this case, the file system software in the OS boot loader 58 converts the file system level write requests into INT 13H disk write requests and issues the INT 13H requests to the int13H handler 64. The int13H handler 64 executing on the target computer 40 services the INT 13H write requests and writes the requested data to the OS image file 56 as described in the flowchart of FIG. 3.

The manufacturer then installs, using the software installation device, the application specific software 61 or firmware which is specific to the application of the embedded system comprising the target computer 40, such as a data acquisition device, in step 312. As the application software 61 is installed, it is written to the OS image file 56 due to the steps performed by the int13H handler 64 and device driver 62 as described above in FIG. 3.

Once the OS image file 56 is created, i.e., the operating system 60 and application software 61 have been installed onto the OS image file 56, the manufacturer copies the OS image file 56 created in steps 310 and 312 to a portable installation medium, such as a CDROM, in step 314. Preferably, an installation medium writer, such as a CDROM writer, is coupled to the host computer 20 for writing the installation medium. The manufacturer also copies the device driver 62 to the installation medium, in step 316. The manufacturer then provides the installation medium and target computer 40 to the end user, in step 318. The manufacturer may perform steps 300 through 318 for each of the operating systems which execute on the host computer 20 thereby creating a separate installation medium for each of the host computer 20 operating systems or a single installation medium capable of being used to install the device driver 62 and OS image file 56 for each of the operating systems which execute on the host computer 20.

The end user installs the device driver from the installation medium onto his or her host computer 20, in step 320. Obviously, the end user host computer 20 is preferably not the same host computer 20 as the manufacturer. However, the operating system executing on the end user and manufacturer host computers are the same. Furthermore, the end user and manufacturer host computers each have an expansion bus which is adapted to receive the target computer 40. Preferably, the end user host computer includes a drive, such as a CDROM drive, for reading the installation medium including the OS image file.

The end user copies the OS image file from the installation medium to the file system 54 on the disk drive 28 of the host computer 20, in step 322. The end user then installs the target computer 40 into the host computer 20, preferably by plugging the target computer 40 into an expansion slot of the host computer 20 adapted to receive the target computer 40, in step 324. The target computer 40 is then powered on and boots the operating system 60 from the OS image file 56 which was copied in step 322 to the disk drive 28 of the host computer 20, in step 326, as described above in FIGS. 2 and 3.

Thus, the present invention advantageously provides an improved system and method for providing relatively large amounts of non-volatile storage for an embedded system device coupled to a host computer. The system and method potentially reduce the overall system cost over previous solutions by using the storage already available on the host computer. The system and method avoid the introduction of mechanical and thermal complexity of connecting a disk drive to the embedded system. The system and method is independent of the host computer and operating system executing on the host computer. The system and method is capable of booting onto the embedded system any operating system which boots itself via INT 13H requests, which may be different from the operating system executing on the host computer.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system, comprising:

a target computer comprising a target processor and a memory coupled to said target processor, wherein said target processor is configured to execute one or more first software programs and a second software program, wherein said second software program is stored in said memory;

a host computer operably coupled to said target computer comprising a central processing unit (CPU), memory and a disk drive, wherein said disk drive includes a file system; and a file included in said file system on said host disk drive, wherein said file is useable by said target computer for data storage;

wherein said first software program executed in said target computer is configured to generate a disk request for data, wherein said disk request includes a sector address;

wherein said second software program executed in said target computer is configured to receive said disk request and provide said sector address to said host computer;

wherein said host computer is configured to receive said sector address and convert said sector address into an offset into said file, wherein said data is located at said offset in said file; and wherein said host computer is configured to read said data from said file at said offset and provide said data to said target computer.

2. The system of claim 1, wherein said first software program comprises a software interrupt 19H Basic Input/Output System (BIOS) warm boot service routine.

3. The system of claim 2, wherein said target computer further comprises a non-volatile memory coupled to said target processor, wherein said warm boot service routine is included in said non-volatile memory.

4. The system of claim 3, wherein said data comprises a portion of a boot loader program stored in said file, wherein said warm boot service routine is operable to load said boot loader program from said file onto said target computer.

5. The system of claim 4, wherein said data comprises a portion of an operating system stored in said file, wherein said boot loader program is operable to load said operating system from said file onto said target computer.

6. The system of claim 5, wherein said data comprises a file system software portion of said operating system, wherein said file system software is operable to map a file input/output operation request to said disk request including said sector address.

7. The system of claim 1, wherein said second software program comprises a disk service routine.

8. The system of claim 7, wherein said target processor comprises an x86 architecture processor.

9. The system of claim 8, wherein said disk service routine comprises a software interrupt 13H Basic Input/ Output System (BIOS) disk service routine.

10. The system of claim 9, wherein said disk request comprises a software interrupt 13H BIOS request, wherein said host computer converts said sector address into said offset into said file by multiplying a predetermined number of bytes per sector by an absolute sector value, wherein said absolute sector value is calculated by converting head, cylinder and sector values comprised in said sector address into said absolute sector value.

11. The system of claim 1, further comprising a memory shared by and coupled to said target processor and a host processor further comprised in said host computer, wherein said shared memory is addressable by said host processor and said target processor, wherein said host computer provides said data to said target computer via said shared memory.

12. The system of claim 11, wherein said second software program provides said sector address to said host computer via said shared memory.

13. The system of claim 1, further comprising a third software program executing on said host computer for receiving said sector address, converting said sector address into said file offset, reading said data from said file at said offset, and providing said data to said target computer.

14. The system of claim 1, wherein said host computer further comprises an input/output (I/O) bus, wherein said target computer is coupled to said I/O bus, wherein said data is transferred from said host computer to said target computer via said I/O bus.

15. The system of claim 14, wherein said I/O bus comprises a bus selected from a list of I/O buses comprising a peripheral component interconnect (PCI) bus, an industry standard architecture (ISA) bus, a NuBus, a VMEbus, a VMEbus extension for instrumentation (VXI) bus, a multi-system extension interface (MXI) bus, an extended industry standard architecture (EISA) bus, a MicroChannel bus, and a general purpose interface bus (GPIB).

16. The system of claim 1, wherein said target processor is further configured to generate an interrupt to a host processor comprised in said host computer to notify said host computer of said second software program providing said sector address to said host computer.

17. The system of claim 1, wherein said host computer is further configured to generate an interrupt to said target processor to notify said target processor of said host computer providing said data to said target computer.

18. The system of claim 1, further comprising one or more additional said target computers, wherein said host computer is operably coupled to each of said one or more additional target computers.

19. The system of claim 18, further comprising one or more additional said files included in said file system on said host disk drive, wherein each of said one or more additional said files is useable by a respective one of said one ore more additional said target computers for data storage.

20. The system of claim 1, wherein said host computer comprises a plurality of CPUs.

21. The system of claim 1, wherein said target computer is configured to execute a first operating system loaded from said file onto said target computer, wherein said host computer is configured to operate a second operating system, wherein said second operating system is different from said first operating system.

22. The system of claim 1, wherein said target computer is configured to perform instrumentation functions.

23. The system of claim 22, wherein said target computer is configured to perform data acquisition.

24. A computer system, comprising:

a host computer comprising a central processing unit (CPU), memory and a disk drive, wherein said disk drive includes a file system;

a target computer comprised in said host computer, wherein said target computer comprises a target processor and a memory coupled to said target processor, wherein said target processor is configured to execute one or more first software programs and a second software program, wherein said second software program is stored in said memory; and a file included in said file system on said host disk drive, wherein said file is useable by said target computer for data storage;

wherein said first software program executed in said target computer is configured to generate a disk request for data, wherein said disk request includes a sector address;

wherein said second software program executed in said target computer is configured to receive said disk request and provide said sector address to said host computer;

wherein said host computer is configured to receive said sector address and convert said sector address into an offset into said file, wherein said data is located at said offset in said file; and wherein said host computer is configured to read said data from said file at said offset and provide said data to said target computer.

25. A computer system, comprising:

a target computer comprising a target processor and a memory coupled to said target processor, wherein said target processor is configured to execute one or more first software programs and a second software program, wherein said second software program is stored in said memory;

a host computer operably coupled to said target computer comprising a central processing unit (CPU), memory and a disk drive, wherein said disk drive includes a file system; and a file included in said file system on said host disk drive, wherein said file is useable by said target computer for data storage;

wherein said first software program executed in said target computer is configured to generate a disk request to write data, wherein said disk request includes a sector address;

wherein said second software program executed in said target computer is configured to receive said disk request, to provide said data to said host computer, and to provide said sector address to said host computer;

wherein said host computer is configured to receive said data and said sector address and to convert said sector address into an offset into said file; and wherein said host computer is configured to receive said data from said target computer and write said data to said file at said offset.

26. A computer system, comprising:

a target computer comprising a target processor and a memory coupled to said target processor, wherein said target processor is configured to execute one or more first software programs and a second software program, wherein said second software program is stored in said memory;

a host computer operably coupled to said target computer comprising a central processing unit (CPU), memory and a non-volatile storage memory, wherein said non-volatile storage memory includes a file system; and a file included in said file system on said host non-volatile storage memory, wherein said file is useable by said target computer for data storage;

wherein said first software program executed in said target computer is configured to generate a non-volatile storage memory request for data, wherein said non-volatile storage memory request includes a non-volatile storage memory address;

wherein said second software program executed in said target computer is configured to receive said non-volatile storage memory request and provide said non-volatile storage memory address to said host computer;

wherein said host computer is configured to receive said non-volatile storage memory address and convert said non-volatile storage memory address into an offset into said file, wherein said data is located at said offset in said file; and wherein said host computer is configured to read said data from said file at said offset and provide said data to said target computer.

27. The system of claim 26, wherein said non-volatile storage memory comprises a disk drive, wherein said second software program comprises a disk service routine.

28. A method for enabling a target computer to use storage resources of its host computer comprised in a computer system, wherein the target computer comprises a target processor and a memory coupled to said target processor, wherein said target processor is configured to execute one or more first software programs and a second software program, wherein said second software program is stored in said memory, wherein the host computer is operably coupled to said target computer and comprises a central processing unit, memory and a disk drive, wherein said disk drive includes a file system, wherein a file is included in said file system on said host disk drive, wherein said file is useable by said target computer for data storage, the method comprising:

said first software program executing in said target computer generating a disk request for data, wherein said disk request includes a sector address;

said second software program executing in said target computer receiving said disk request and providing said sector address to said host computer;

said host computer receiving said sector address and converting said sector address into an offset into said file, wherein said data is located at said offset in said file; and said host computer reading said data from said file at said offset and providing said data to said target computer.

29. The method of claim 28, wherein said first software program comprises a software interrupt 19H Basic Input/Output System (BIOS) warm boot service routine.

30. The method of claim 29, further comprising said warm boot service routine loading said boot loader program from said file onto said target computer.

31. The method of claim 30, further comprising said boot loader program loading said operating system from said file onto said target computer.

32. The method of claim 31, further comprising a file system software portion of said operating system mapping a file input/output operation request to said disk request including said sector address.

33. The method of claim 28, wherein said second software program comprises a software interrupt 13H Basic Input/Output System (BIOS) disk service routine.

34. The method of claim 28, further comprising said host computer converting said sector address into said offset into said file by multiplying a predetermined number of bytes per sector by an absolute sector value, wherein said absolute sector value is calculated by converting head, cylinder and sector values comprised in said sector address into said absolute sector value.

35. The method of claim 28, wherein said host computer providing said data to said target computer comprises said host computer providing said data to said target computer via a memory shared by said host computer and said target computer.

36. The method of claim 28, wherein said host computer providing said sector address to said target computer comprises said host computer providing said sector address to said target computer via a memory shared by said target processor and a host processor comprised in said host computer.

37. The method of claim 28, wherein said receiving said sector address, said converting said sector address into an offset into said file, said reading said data from said file at said offset, and said providing said data to said target computer is performed by a third software program executing on said host computer.

38. The method of claim 28, further comprising said target computer generating an interrupt to a host processor comprised within said host computer to notify said host computer of said second software program providing said sector address to said host computer.

39. The method of claim 28, further comprising said host computer generating an interrupt to said target processor to notify said target processor of said host computer providing said data to said target computer.

40. The method of method of claim 28, wherein said computer system further comprises one or more additional said target computers, and one or more additional said files included in said file system on said host disk drive, the method further comprising:

a first software program executing in each of said one or more additional target computers generating a respective disk request for respective data, wherein each said respective disk request includes a respective sector address;

a second software program executing in each of said one or more additional target computers receiving said respective disk request and providing said respective sector address to said host computer;

said host computer receiving each of said respective sector addresses and converting each of said respective sector addresses into a respective offset into said file, wherein said respective data is located at said respective offset in said respective one or more additional said files; and said host computer reading said respective data from said respective one or more additional said files at said respective offset and providing said respective data to said one or more additional target computers.

41. A method for enabling a target computer to use storage resources of its host computer comprised in a computer system, wherein the target computer comprises a target processor and a memory coupled to said target processor, wherein said target processor is configured to execute one or more first software programs and a second software program, wherein the host computer is operably coupled to said target computer and comprises a central processing unit (CPU), memory and a disk drive, wherein said disk drive includes a file system, wherein a file is included in said file system on said host disk drive, wherein said file is useable by said target computer for data storage, the method comprising:

said first software program executing in said target computer generating a disk request to write data, wherein said disk request includes a sector address;

said second software program executing in said target computer receiving said disk request and providing said data to said host computer;

said second software program providing said sector address to said host computer;

said host computer receiving said sector address and converting said sector address into an offset into said file; and said host computer receiving said data from said target computer and writing said data to said file at said offset.

42. A method for installing an operating system onto a computer system comprising a first host computer comprising a processor, memory and a disk drive, wherein said disk drive includes a file system, wherein said file system includes a file, wherein said file is usable by a target computer for data storage, the method comprising:

installing a first target computer into said first host computer, wherein said installing said first target computer includes connecting said first target computer into an expansion slot of said first host computer adapted to receive said first target computer, wherein said first target computer includes a processor configured to execute a disk service routine for servicing disk requests from said first target computer processor;

connecting a software installation device to said first target computer including a first software installation medium, wherein said first software installation medium includes an operating system and a software installation program for executing on said first target computer processor to install said operating system;

installing a device driver program to execute on said first host computer, wherein said device driver is operable to receive data from said first target computer and write said data to said first host computer disk drive; and executing said software installation program on said first target computer processor after said installing said first target computer, said connecting said software installation device and said installing said device driver, wherein said executing said software installation program comprises:

said software installation program reading a portion of said operating system from said first software installation medium and issuing a disk request to said disk service routine to write said portion of said operating system, wherein said disk request includes a parameter specifying a sector address;

said disk service routine providing said sector address to said device driver;

said device driver receiving said sector address and converting said sector address to an offset into said file in said file system of said first host computer disk drive; and said device driver receiving said portion of said operating system from said first target computer and writing said portion of said operating system to said file at said converted offset into said file.

43. The method of claim 42, further comprising removing said software installation device from said first target computer.

44. The method of claim 42, further comprising performing said software installation program reading a portion of said operating system from said first software installation medium and issuing a disk request to said disk service routine to write said portion of said operating system, said disk service routine providing said sector address to said device driver, said device driver receiving said sector address and converting said sector address to an offset into said file in said file system of said first host computer disk drive, and said device driver receiving said portion of said operating system from said first target computer and writing said portion of said operating system to said file at said converted offset into said file for each portion of said operating system until said operating system is installed onto said file of said first host computer disk drive.

45. The method of claim 44, further comprising copying said file and said device driver to a second installation medium.

46. The method of claim 45, further comprising:

installing a second target computer into a second host computer, wherein said second target computer is functionally equivalent to said first target computer and said second host computer is functionally equivalent to said first host computer;

copying said file from said second installation medium to the file system on said disk drive of said second host computer;

installing said device driver program from said second installation medium to execute on said host computer; and said second target computer bootstrapping said operating system from said file on said second host computer disk drive for execution on said second target computer processor.

* * * * *